US005596726A

United States Patent [19]
Thielen

[11] Patent Number: 5,596,726
[45] Date of Patent: Jan. 21, 1997

[54] METHOD AND SYSTEM FOR BUFFERING TRANSIENT DATA USING A SINGLE PHYSICAL BUFFER

[75] Inventor: David Thielen, Redmond, Wash.

[73] Assignee: Microsoft Corporation, Redmond, Wash.

[21] Appl. No.: 481,218

[22] Filed: Jun. 7, 1995

Related U.S. Application Data

[63] Continuation of Ser. No. 85,770, Jun. 30, 1993, abandoned.

[51] Int. Cl.$^6$ ..................................................... G06F 13/00
[52] U.S. Cl. ............... 395/250; 395/200.07; 395/200.08; 395/824; 348/719
[58] Field of Search ............................. 395/250, 200.07, 395/200.08; 348/719

[56] References Cited

U.S. PATENT DOCUMENTS

| 4,499,576 | 2/1985 | Fraser | 370/60 |
|---|---|---|---|
| 4,980,852 | 12/1990 | Giroir et al. | 364/900 |
| 5,247,626 | 9/1993 | Firoozmand | 395/200.07 |
| 5,325,492 | 6/1994 | Bonevento et al. | 395/325 |
| 5,335,326 | 8/1994 | Nguyen et al. | 395/250 |
| 5,355,457 | 10/1994 | Shebanow et al. | 395/375 |
| 5,486,876 | 1/1996 | Lew et al. | 348/719 |
| 5,488,694 | 1/1996 | McKee et al. | 395/824 |
| 5,488,724 | 1/1996 | Firoozmand | 395/200.07 |

OTHER PUBLICATIONS

D. Banks et al., "A High Performance Network Architecture For a PA–RISC Workstation", *IEEE Journal on Selected Areas in Communication*, vol. 11, No. 2, Feb. 1993, New York pp. 191–202.

T. W. Pratt, "Programming Languages, Design and Implementation", *Prentice–Hall*, 1975 Englewood Cliffs, Ch. 6.

H. Kanakia et al., "The VMP Network Adapter Board (NAB): High Performance Network Communication for Multiprocessors", *Sigcomm '88 Conference Proceedings*, vol. 18, No. 4, Aug., 1988, Stanford, pp. 175–187.

C. Murray Woodside et al., "The Effect of Buffering Strategies on Protocol Execution Performance", *IEEE Transactions on Communications*, vol. 37, No. 6, Jun. 1989, New York, pp. 545–553.

Waite, Mitchell, and Prata, Stephen W., "The Waite Group's New C Primer Plus®, Second Edition", pp. 598–602, May 1993.

"Programmer's Reference, vol. 1: Overview", Microsoft® Windows™ Version 3.1, Microsoft Corporation, pp. 64–65, 207–210, 218–220, 1992.

"Programmer's Reference, vol. 2: Functions", Microsoft® Windows™ Version 3.1, Microsoft Corporation, pp. 264, 337–339, 779, 826–828, 1992.

Harris, Jed, and Ruben, Ira, "Bento Specification", Revision 1.0d4, Apple Computer, pp. 17, 52–53, 60–61, 73, Aug. 1992.

*Primary Examiner*—William M. Treat
*Assistant Examiner*—Saleh Najjar
*Attorney, Agent, or Firm*—Seed and Berry LLP

[57] ABSTRACT

A computer method and system for buffering transient data passed between multiple protocols utilizes a single, physical buffer having multiple, shifting logical buffers therein. Each protocol is assigned a logical buffer in the physical buffer. The transient data is passed between protocols by shifting the corresponding logical buffers, shifting a first logical buffer to exclude the data and shifting a next logical buffer to include the same data. As a result, the data does not have to be rewritten in the physical buffer.

21 Claims, 6 Drawing Sheets

METHOD AND SYSTEM FOR BUFFERING TRANSIENT DATA USING A SINGLE PHYSICAL BUFFER

CROSS-REFERENCE TO RELATED APPLICATION

This application is a continuation of U.S. patent application Ser. No. 08/085,770, filed Jun. 30, 1993 now abandoned.

TECHNICAL FIELD

The present invention relates generally to the field of data communications and, more particularly, to communications protocols which regulate data transfer between a computer and modem.

BACKGROUND OF THE INVENTION

Figure 1:
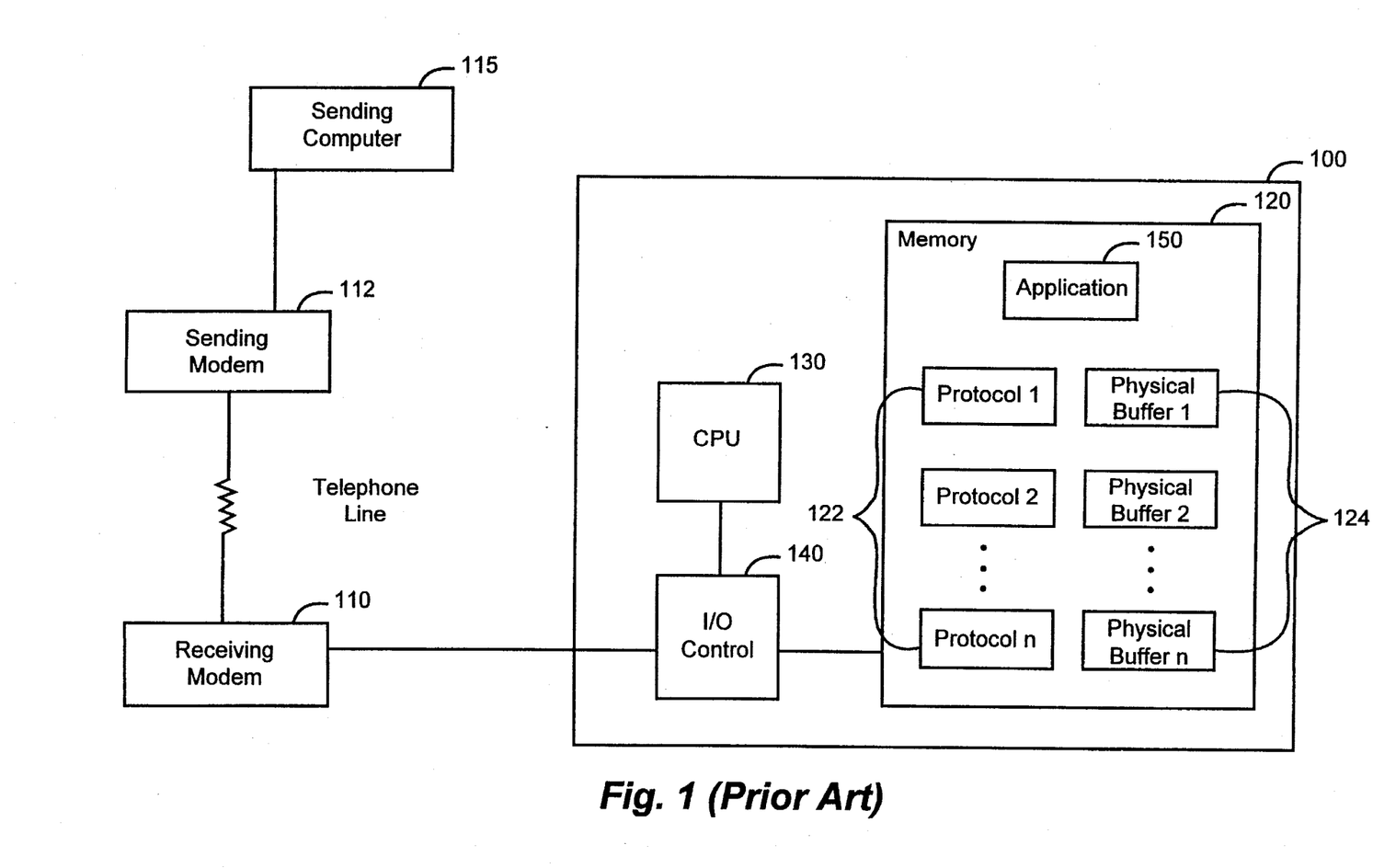
FIG. 1 is a block diagram of a prior art computer system having multiple physical buffers for use by respective protocols.

It is well known in the field of communications to transfer data from a sending computer to a receiving computer via a communications link. Such a communications link may be established over a network via dedicated telephone lines or physical cables or over a temporarily established connection via a telephone line. Where the communications link is established between two computers over a telephone line, the communications link between the two computers is typically defined as shown in FIG. 1, which is a block diagram of a prior art computer system. In the prior art computer system shown in FIG. 1, a receiving computer 100 is connected to a receiving modem (modulator/demodulator) 110. The receiving modem 110 communicates over a telephone line with a sending modem 112 that is connected to a sending computer 115. The sending computer 115 sends the data to the receiving computer 100 by first sending digital data to the sending modem 112, which encodes the digital data into a signal sent over the telephone line using frequency modulation techniques. The receiving modem 110 demodulates the signal to extract the digital data from the signal and sends the digital data to the receiving computer 100.

Typical modem-to-modem communication, such as that described above with reference to FIG. 1, is asynchronous. That is, the receiving computer 100 cannot predict the timing of the arrival of the data because the data arrives asynchronously relative to the clock of the receiving computer 100. Because of this, the receiving computer 100 stores in a memory 120 a number of communications protocols 122 which control the flow of the data. Each of the protocols 122 are implemented as an executable computer program performed by a CPU 130 in the receiving computer to control the flow of the data from the communications link to the CPU 130 via an I/O Control 140. The protocols 122 are typically provided by an application program 150 (shown separately in the memory 120) and called by the application program as subprograms of the application program 150.

Each protocol 122 described above requires a corresponding protocol buffer 124 in the memory 120 in which to store the data while transient between the computer and communications interface. Each protocol buffer 124 is a separate physical buffer which represents a physical block of memory of a fixed size in, for example, a data segment provided for the corresponding protocol. Each protocol 122 stores the transient data in its corresponding protocol buffer until it determines, in accordance with its own requirements, that the transient data can be passed on to a next protocol, to the computer, or to the modem, as appropriate. Typically, the separate buffers 124 have been each implemented with a block of memory allocated by an operating system (not shown) executing on the CPU 130. Thus, operation of n protocols 122 by the prior art computer system requires n memory allocations of enough memory to implement n buffers 124. When each protocol 122 receives data from the modem 110, the CPU 130 or a previously executed one of the protocols 122, the protocol writes that data into its corresponding buffer 124. Thus, the transfer of data between the computer 100 and receiving modem 110 under control of the n protocols 122 also requires the computer 110 to write and rewrite the same data n times.

SUMMARY OF THE INVENTION

It is an object of the invention to buffer transient data passed between devices under the control of multiple protocols without requiring the allocation of a separate buffer for each protocol.

It is a further object of the present invention to buffer transient data passed between devices under the control of multiple protocols without requiring the rewriting of the transient data each time the transient data is passed to one of the protocols.

Additional objects of the present invention will become apparent as the invention is more fully described below.

The above objects are realized by the present invention. The present invention provides a computer method and system for buffering transient data passed between multiple protocols. This method and system utilizes a single, physical buffer having multiple, shifting logical buffers therein. In a preferred embodiment of the invention, the transient data is transferred sequentially between a computer and a modem. Each protocol is assigned a logical buffer which is a separate region of contiguous memory in the physical buffer. The shifting logical buffers are defined by pointers to the beginning and end of each logical buffer within the single physical buffer which change when the data is passed among the protocols. The protocols control the flow of data that is sequentially transferred between devices, such as between a computer and modem. Each protocol maintains a logical buffer in the physical buffer. The logical buffer is a shifting region in the physical buffer which includes transient data that has been passed to the protocol and has not yet been passed from the protocol. When the data is sequentially transferred, it is stored contiguously in the physical buffer in an order corresponding to its sequence of transfer between the devices. The protocols then control the flow of the data, each protocol requesting and holding the data in accordance with its own requirements. Each protocol holds the data by buffering it in a corresponding logical buffer in the physical buffer. The data is passed to a next protocol by shifting the logical buffer of the passing protocol to no longer include that data, and shifting the buffer for the protocol to which the data is passed to include that same data.

The logical buffers are shifted by receding the pointers which define the logical buffers. When a first protocol passes data to a second protocol, a corresponding first logical buffer is shifted to exclude the passed data by receding the pointer to the end of the first logical buffer to point to a memory location in the physical buffer which precedes the location in which the passed data is stored. The second logical buffer is shifted by receding the pointer to the beginning of the second logical buffer to also point to a memory location in the physical buffer which precedes the location in which the passed data is stored. Thus, multiple physical buffers are not required and the transient data does not have to be rewritten each time it is passed between protocols.

DETAILED DESCRIPTION OF THE INVENTION

The invention provides a method and system for buffering transient data passed among multiple protocols. The method and system provided by the invention utilizes a single, physical buffer having multiple, shifting logical buffers therein. The shifting logical buffers are defined by pointers to the beginning and end of each logical buffer within the single physical buffer which change when the data is passed among the protocols. The protocols control the flow of data than is sequentially transferred between devices, such as between a computer and modem. Each protocol maintains a logical buffer in the physical buffer. The logical buffer is a shifting region in the physical buffer which includes transient data that has been passed to the protocol and has not yet been passed from the protocol. When the data is sequentially transferred, it is stored contiguously in the physical buffer in an order corresponding to its sequence of transfer between the devices. The protocols then control the flow of the data, each protocol requesting and holding the data in accordance with its own requirements. Each protocol holds the data by buffering it in a corresponding logical buffer in the physical buffer. The data is passed to a next protocol by shifting the logical buffer of the passing protocol to no longer include that data, and shifting the buffer for the protocol to which the data is passed to include than same data.

The logical buffers are shifted by receding the pointers which define the logical buffers. When a first protocol passes data to a second protocol, a corresponding first logical buffer is shifted to exclude the passed data by receding the pointer to the end of the first logical buffer to point to a memory location in the physical buffer which precedes the location in which the passed data is stored. The second logical buffer is shifted by receding the pointer to the beginning of the second logical buffer to also point to a memory location in the physical buffer which precedes the location in which the passed data is stored. Thus, multiple physical buffers are not required and the transient data does not have to be rewritten each time it is passed between protocols.

Figure 2:
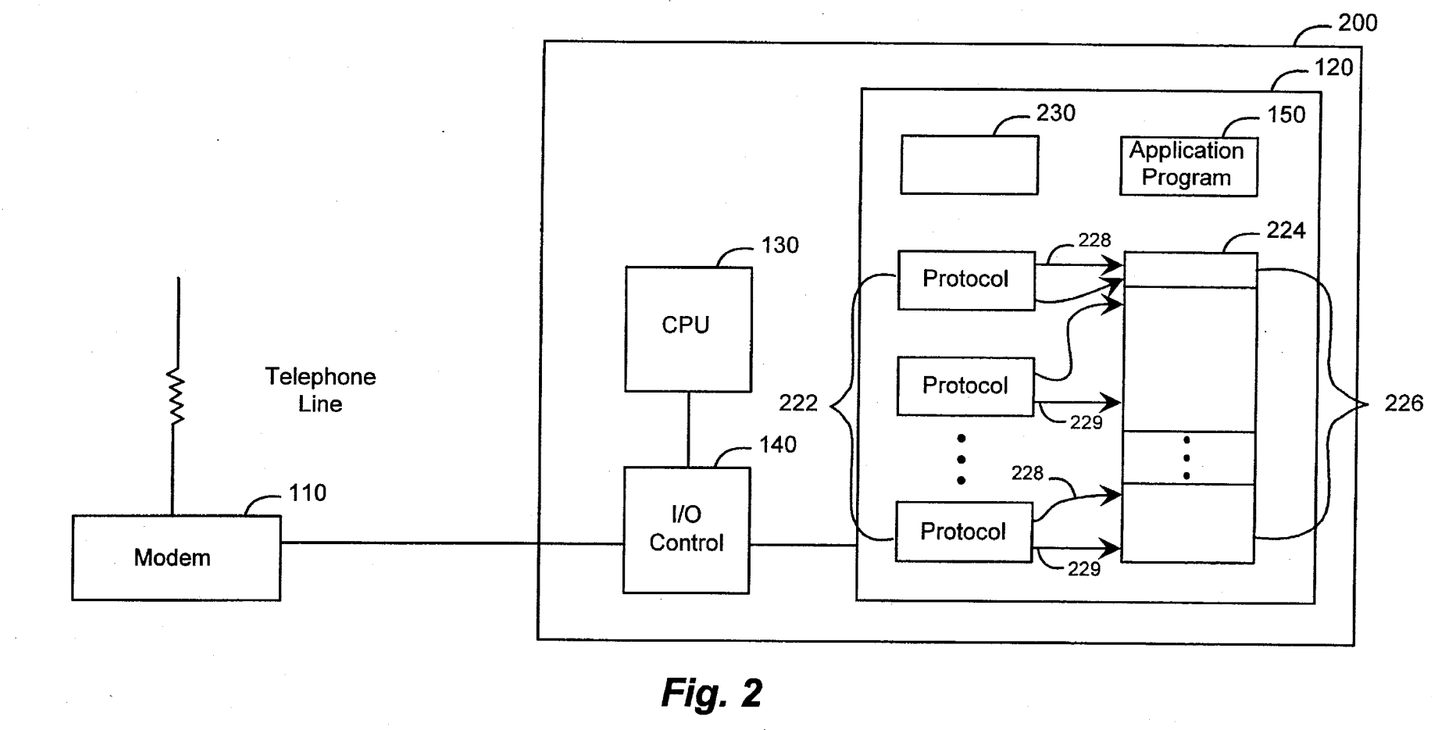
FIG. 2 is a block diagram of the computer system of a preferred embodiment of the present invention.

A block diagram of the computer system in a preferred embodiment of the present invention is shown in FIG. 2. The computer 200 is connected to the modem 110 of FIG. 1. The computer 200 also contains a memory 220 which is accessible by the CPU 130 and the modem 110 via the I/O control unit 140 of FIG. 1. The memory 220 stores a set of protocols 222 which control the flow of transient data between the computer 200 and the modem 110 when data is transferred to or from the second computer. The computer system shown in FIG. 2 provides a single, physical, common protocol buffer 224. Each of the protocols 222 utilizes this common protocol buffer 224 to hold the transient data until that protocol determines that the transient data can be passed to a next one of the protocols 222, to the CPU 130 executing the application, or to the modem 110, as appropriate.

The protocols 222 control the flow of data that is sequentially transferred between devices, such as between a computer and a modem. When the data is sequentially transferred, it is stored contiguously in the common protocol buffer 224 in an order corresponding to its sequence of transfer between the devices. One of a set of logical buffers 226 of the common protocol buffer 224 is maintained for each protocol 222 which stores the data when it is passed to the protocol 222. The logical buffers 226 are unfixed, contiguous regions within the common protocol buffer 224 whose locations are controlled by the present invention. The present invention passes data between the protocols 222 by controlling the locations of the logical buffers 226 within the common protocol 224. The invention shifts the logical buffers 226 by changing the beginning and end of each logical buffer 226. Each protocol 222 uses its corresponding logical buffer 226 to store the transient data until the protocol 222 determines that the transient data can be passed on. When the protocol 222 determines that the data can be passed to a next protocol 222, the present invention passes the data by shifting the logical buffer 226 provided for the passing protocol to no longer include the data, and by shifting the logical buffer 226 provided for the protocol to which the data is passed to include the data.

Once the transient data is stored in the common protocol buffer 224, it does not have to be rewritten into a new location in order to be passed among the protocols 222. When transient data is transferred from a first device written into the common protocol buffer 224, it is stored in a memory location just preceding, and sequentially adjacent to, the last transient data written in the common protocol buffer 224. The transient data remains in this location until it is transferred to the second device. When the protocols 222 are executed, the transient data is passed among the protocols 222 by shifting the logical buffers 224 to exclude the transient data from the passing protocol 222 and include the transient data in the protocol 224 to which it is passed.

Each logical buffer 226 in the common protocol buffer 224 is defined by maintaining a beginning pointer 228 to the beginning of the logical buffer 226 and an end pointer 229 to the end of the logical buffer 226. The pointers 228 and 229 are used to access the logical buffer 226 when the logical buffer 226 holds transient data therein. For example, as shown in FIG. 2, a beginning pointer 228 is maintained for each logical buffer 226 and a pointer 229 is also maintained for each logical buffer 226. When a first protocol 222 passes transient data to a next protocol 222, the ending pointer 229 to the end of a first logical buffer 226 corresponding to the first protocol 222 is receded to point to a preceding memory location in the common protocol buffer 224. The first logical buffer 226 thereby excludes the portion of the common protocol buffer 224 storing the transient data. Also, the beginning pointer 228 to the beginning of the next logical buffer 226 corresponding to the next protocol 222 is receded to point to a preceding memory location in the common protocol buffer 224. The next logical buffer 226 thereby includes the portion of the common protocol buffer 224 storing the transient data.

Figure 3:
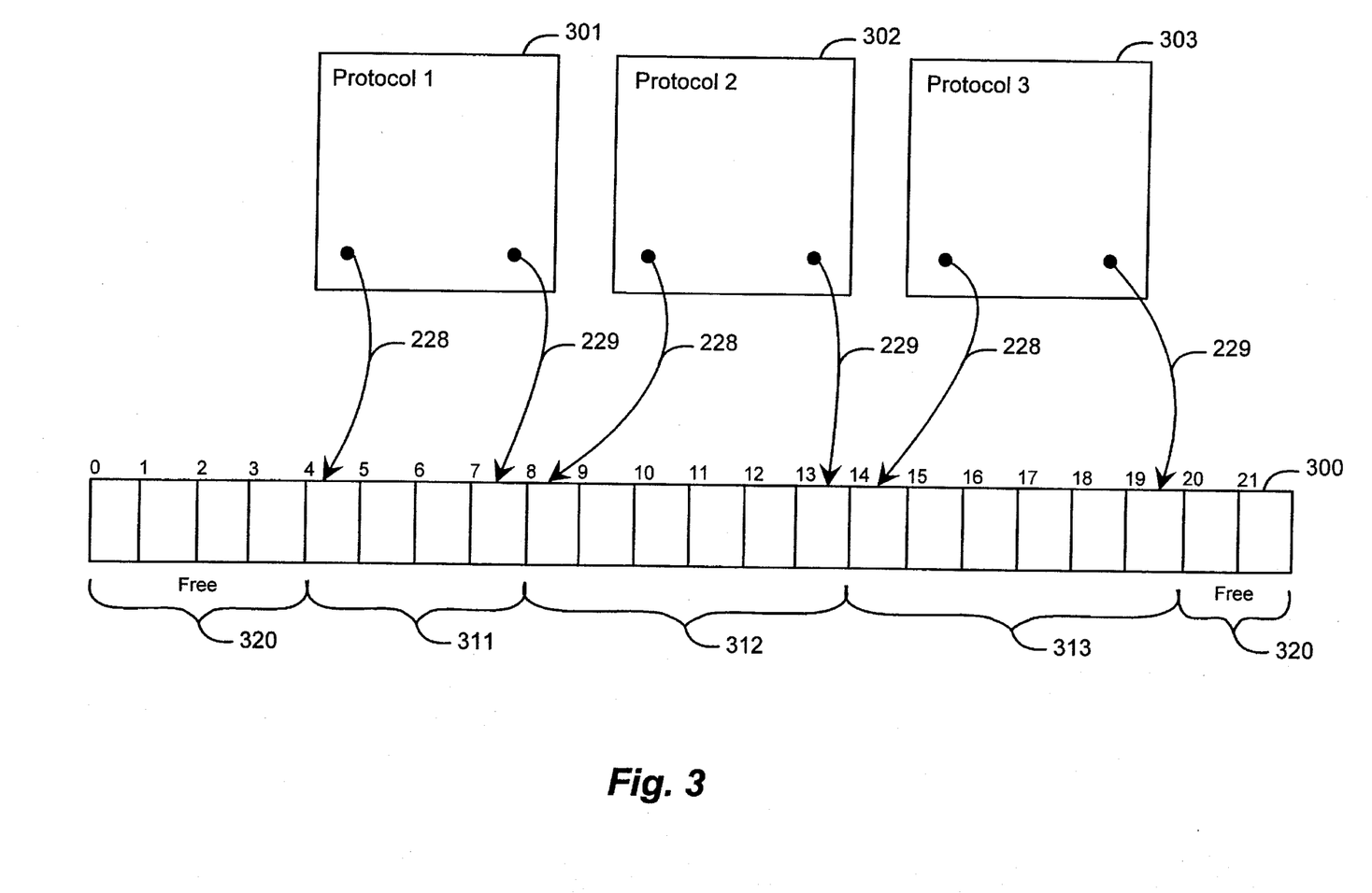
FIG. 3 is an example illustration of the common protocol buffer of the preferred embodiment of the present invention.
Figure 4:
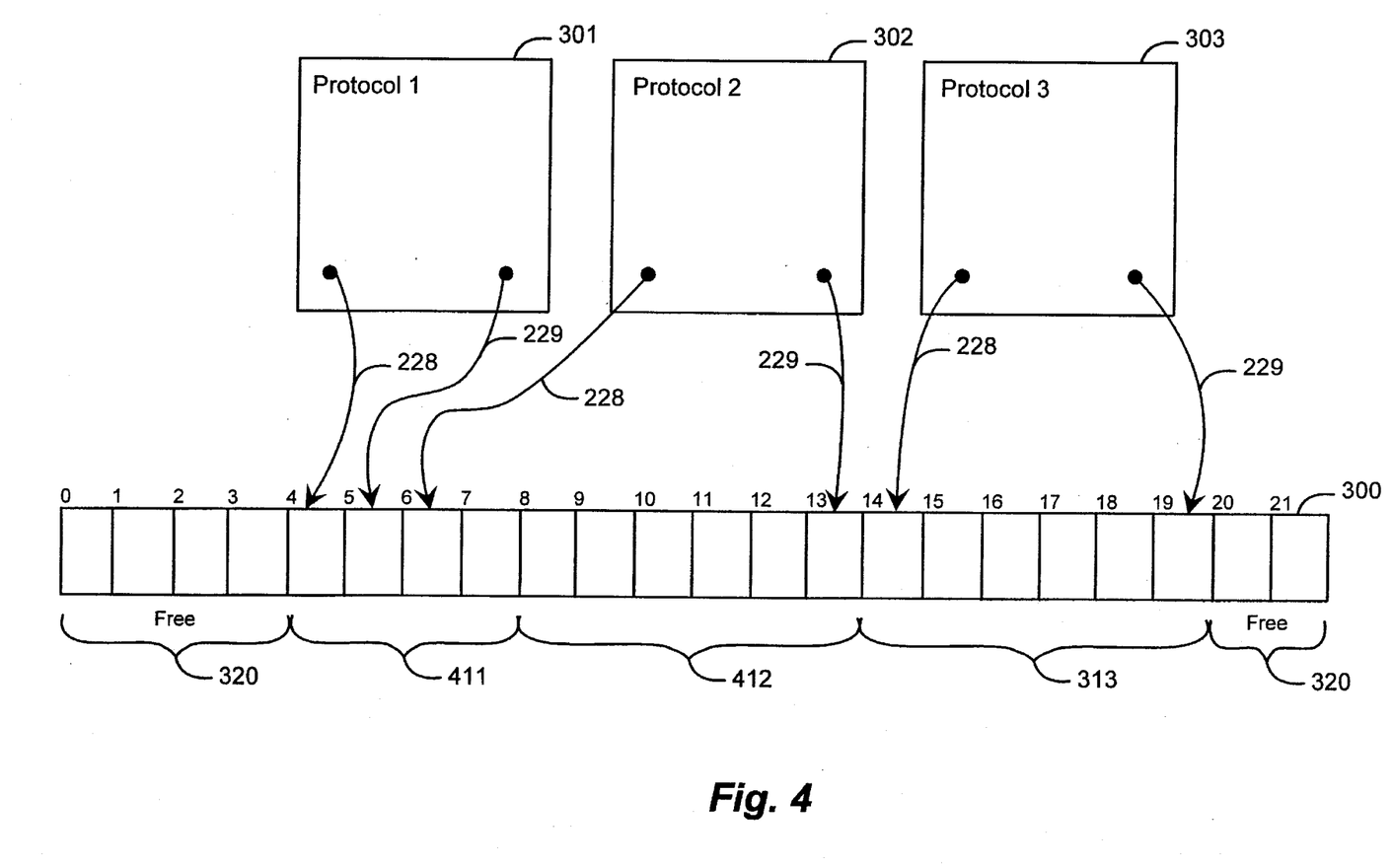
FIG. 4 is an example illustration of the common protocol buffer shown in FIG. 3 after data has been passed among protocols.

To further illustrate the operation of the method of passing the transient data among sequentially executing protocols in the preferred embodiment, specific examples are provided in FIGS. 3 and 4. FIG. 3 illustrates an example common protocol buffer 300. The example common protocol buffer 300 is, for example, the common protocol buffer 224, designed to be suitable for buffering a series of single bytes of transient data, such as a stream of characters passed between the computer 200 and modem 210 shown in FIG. 2. The example common protocol buffer 300 contains a set of contiguous bytes (numbered 0–21) of memory. The 22-byte size of the common protocol buffer 300 is merely illustrative. The actual common protocol buffer 224 is, for example, 16K bytes in size. Three protocols 301, 302 and 303 are shown which are examples of the protocols 222 shown in FIG. 2. Each protocol 301, 302 and 303 references a corresponding logical buffer 311, 312 and 313, respectively in the buffer 300, the logical buffers 311, 312 and 313 being examples of the logical buffers 226 shown in FIG. 2.

An example current state of the buffer 300 is shown in FIG. 3 which represents a current state of the buffer 300 at a given time. In this current state, the logical buffer 311 includes bytes 4–7, the logical buffer 312 includes bytes 8–13 and the logical buffer 313 includes bytes 14–19. The protocol 301 references the logical buffer 311 by accessing a beginning pointer 228 to the beginning of the logical buffer 311 (byte 4) and an end pointer 229 to the end of the logical buffer 311 (byte 7). Similarly, the protocol 302 references the logical buffer 312 by accessing a beginning pointer 228 to the beginning of the logical buffer 312 (byte 8) and an end pointer 229 to the end of the logical buffer 312 (byte 13). The protocol 303 references the logical buffer 313 by accessing a beginning pointer 228 to the beginning of the logical buffer 313 (byte 14) and an end pointer 229 to the end of the logical buffer 313 (byte 19). The example common protocol buffer 300 also contains a free area 320 which includes, in the current state shown in FIG. 3, byte 20 through byte 3 (the preferred method implements the buffer 300 to wrap from byte 0 to byte 21, such that a pointer pointing to byte 0 which is decremented by one byte will point to byte 21). The free area is identifiable as beginning with the byte just beyond the pointer to the end of the region 313 and ending with the byte just before the pointer to the beginning of the region 311.

An example next state of the example common protocol buffer 300 is shown in FIG. 4. The example next state of the buffer 300 shown in FIG. 4 represents the state of the buffer 300 shown in FIG. 3 just after transient data has been passed among the protocols 301, 302 and 303. In this next state, the transient data stored in bytes 6 and 7 has been passed from protocol 1 to protocol 302. The transient data is passed from the protocol 301 to the protocol 302 by shifting the logical buffers 311 and 312 to become regions 411 and 412, shown in FIG. 4. Specifically, the end pointer 229 pointing to the end of the logical buffer 311 is receded to point to byte 5 instead of byte 7, and the beginning pointer 228 pointing to the beginning of the logical buffer 312 is receded to point to byte 6 instead of byte 8. As a result, logical buffer 312 is updated to include the transient data stored in bytes 6 and 7, while logical buffer 311 is updated to exclude that same transient data. In this way, the transient data is passed from protocol 301 (which originally buffered the transient data in logical buffer 311) to protocol 302, (which now buffers the transient data in logical buffer 312).

In the preferred embodiment, the above-described operations are performed by a master communications driver 230 stored in the memory 120. The master communications driver 230 maintains the location of the shifting logical buffers 226 and also keeps track of the location in the common protocol buffer into which new data transferred from a first device will be placed and a location from which data to be transferred to a second device will be written. Additionally, the master communications driver 230 maintains a pointer NextByteIn in the memory 120 which points to the byte in the common protocol buffer 224 in which the next byte of transient data transferred from the first device is to be stored in the common protocol buffer 224. The master communications driver 230 also maintains a pointer NextByteOut which points to a next byte in the common protocol buffer 224 to be transferred to the second device.

Figure 5:
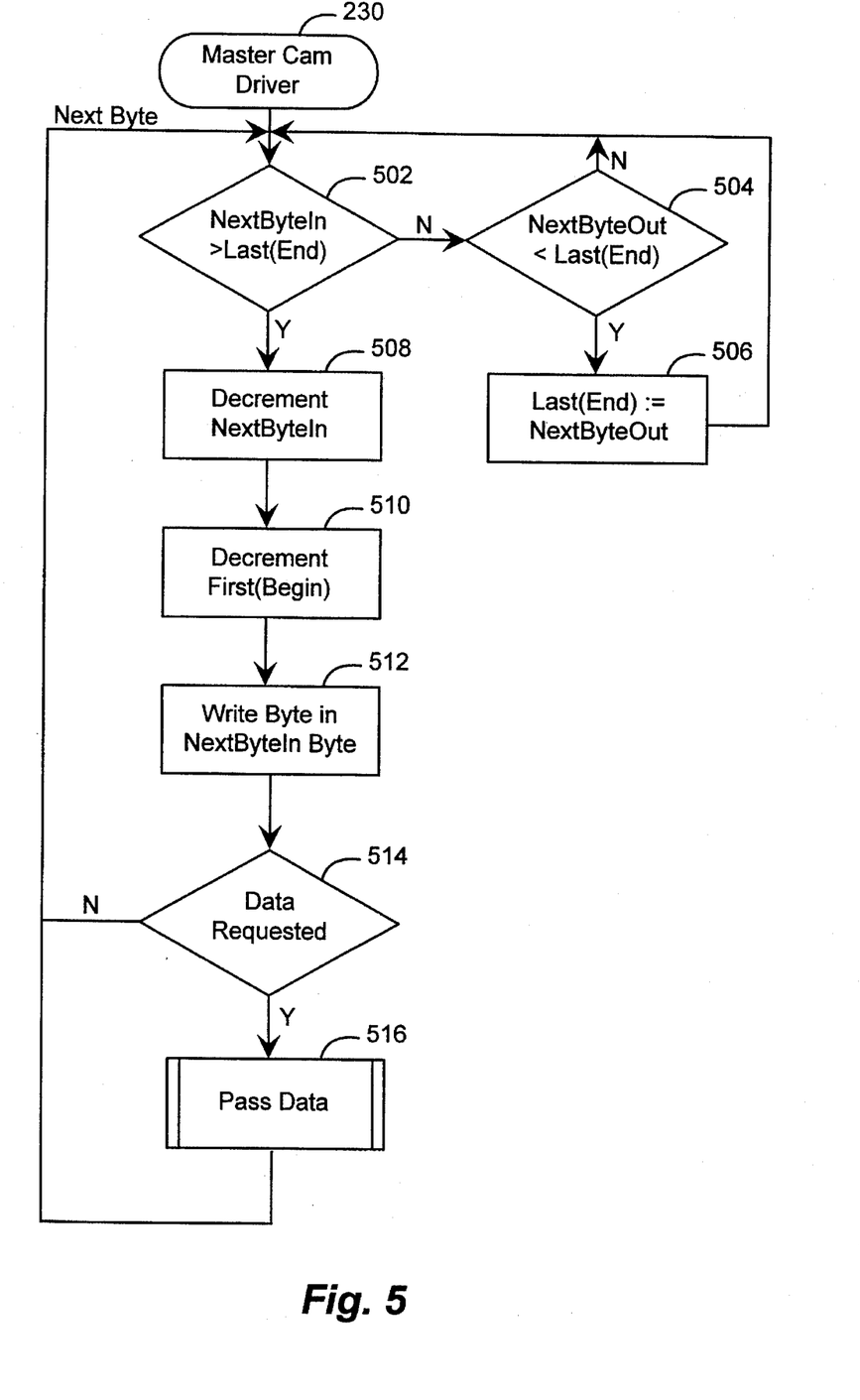
FIG. 5 is a general flow diagram of the steps performed by the master communications driver when data is transferred from a first device to a second device.

FIG. 5 is a general flow diagram of the steps performed by the master communications driver 230 shown in FIG. 2 when data is transferred from a first device to a second device (for example, from the computer 100 to the modem 110, or vice versa.) Steps 502–516 are repeated for each new byte of data transferred. In step 502, the master communications driver 230 determines whether the NextByteIn pointer is greater than the end pointer 229 of the last logical buffer 226 provided for the last protocol 224 to execute before transferring the data to the second device. If not, the master communications driver 230 determines that there is no space in the common protocol buffer 224 in which to write the new character because the buffer has become full. In this case, control proceeds to step 504, wherein the master communications driver 230 determines whether the pointer NextByteOut is less than the end pointer 229 of the last logical buffer 226.

If the pointer NextByteOut is less than the end pointer 229 of the last logical buffer 226, this means that one or more bytes of data have been written out of the last logical buffer 226 in the common protocol buffer 224, such that the memory in which these characters were stored are no longer needed by the last protocol. If this is the case, the last logical buffer 226 is assigned in step 506 to point to the same byte to which the pointer NextByteOut points. Control then loops to again perform step 502. If, however, the master communications driver 230 determines in step 504 that the NextByteOut pointer is not less than the end pointer 229 of the last logical buffer 226, then control simply loops to repeat step 502 and step 504 until the NextByteOut pointer is less than the end pointer 229.

If the master communications driver determines in step 502 that the NextByteIn pointer is greater than the end pointer 229 for the last protocol, then the master communications driver 230 determines that there is room to write the new byte of transient data into the common protocol buffer 224. If so, control proceeds to step 508 wherein the pointer NextByteIn is receded by being decremented by one byte. Then, in step 510, the beginning pointer 228 in the next logical buffer 226 for the next protocol 222 is also receded by being decremented by one byte. Then, in step 512, the master communications driver 230 writes the new byte into the location in the common protocol buffer 224 pointed to by the pointer NextByteIn.

Figure 6:
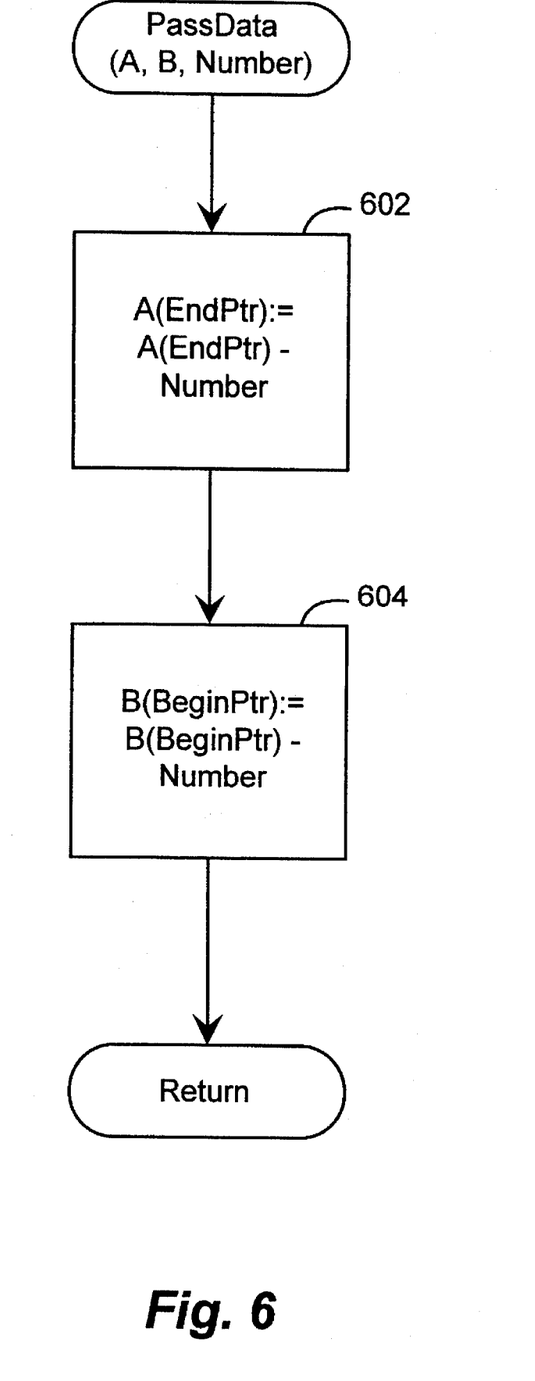
FIG. 6 is a flow diagram of the steps performed when data is passed between two protocols in the preferred embodiment.

Control then proceeds to step 514, where it is determined whether transient data stored in any of the logical buffers 224 has been requested to be shifted by a next protocol. If so, the routine PassData is called in step 516. Otherwise, control loops to repeat steps 502 through 516. After step 516 is performed, control also loops to repeat steps 502 through 516. The routine PassData is shown in FIG. 6, which illustrates the steps performed when a number of bytes of data are passed from a protocol A to a protocol B. In step 602, the end pointer 229 pointing to the end of the region 226 of the common protocol buffer 224 provided for protocol A is receded by being decremented by the number of characters to be passed. In step 604, the beginning pointer 228 pointing to the beginning of the region 226 provided for protocol B is also receded by being decremented by the number of characters to be passed. The routine then returns.

Although the present invention has been described with reference to a specific embodiment, it should be appreciated that one of ordinary skill in the art may make various changes in the form and scope of the invention without departing from the spirit of the invention. The scope of the invention is defined by the claims.

I claim:

1. A method of buffering transient data, the transient data being passed among multiple communications protocols while being transferred from a first device to a second device, the method performed by a computer and comprising the steps of:

(a) providing a communications management driver for managing passing of the transient data between the multiple communications protocols;

(b) using the communications management driver, allocating to each of the multiple communications protocols a corresponding logical buffer comprising a region in a common physical buffer, the common physical buffer storing data contiguously in an order in which the data is transferred;

(c) receiving from a first communications protocol a request for the transient data;

(d) in response to the received request from the first communications protocol, using the communications management driver, passing the transient data from the first device to the first communications protocol by shifting, in the common physical buffer, an allocated first logical buffer that corresponds to the first communications protocol to include a new portion of the common physical buffer and by storing the transient data in the new portion;

(e) receiving from a last communications protocol a request for the transient data; and (f) in response to the received request from the last communications protocol, using the communications management driver, passing the transient data from the first communications protocol to the last communications protocol by shifting, in the common physical buffer, an allocated last logical buffer to include the portion of the common physical buffer storing the transient data and by shifting, in the common physical buffer, the allocated first logical buffer to exclude the portion of the common physical buffer storing the transient data.

2. The method of claim 1, further comprising the steps of:

(g) receiving a request to transfer the transient data to a second device; and (h) in response to the request to transfer the transient data to the second device,
 (i) transferring to the second device the transient data from the allocated last logical buffer that corresponds to the last communications protocol; and
 (ii) after transferring to the second device the transient data, using the communications management driver, shifting the allocated last logical buffer to exclude the portion of the common physical buffer storing the transient data.

3. The method of claim 1 wherein step (f) further comprises passing the transient data from the first communications protocol to any number of intermediate communications protocols, each corresponding to an allocated intermediate logical buffer in the common physical buffer, the first, intermediate and last logical buffers being allocated contiguously within the common physical buffer in an order corresponding to an order in which the transient data is passed among the allocated first, intermediate and last communications protocols, by performing the steps of:

for each intermediate communications protocol, using the communications management driver,
 (i) shifting the allocated intermediate logical buffer corresponding to the intermediate communications protocol to include a portion of a preceding allocated logical buffer storing the transient data, and
 (ii) shifting the preceding allocated logical buffer to exclude the portion storing the transient data.

4. The method of claim 3 wherein step (d) is repeated as often as the first communications protocol requests the transient data, and steps (f)(i) and (f)(ii) are repeated as often as an intermediate communications protocol requests the transient data.

5. The method of claim 3, each allocated intermediate logical buffer having a beginning pointer that points to a beginning of the allocated intermediate logical buffer and an ending pointer that points to an end of the allocated intermediate logical buffer, the beginning pointer and the ending pointer of each allocated intermediate logical buffer being controlled by the communications management driver, wherein the step of (f)(i) shifting the allocated intermediate logical buffer comprises modifying the beginning pointer of the allocated intermediate logical buffer to point to a preceding memory location in the common physical buffer, and wherein the step of (f)(ii) shifting the preceding allocated logical buffer comprises modifying the ending pointer of the preceding allocated logical buffer to point to a preceding memory location in the common physical buffer.

6. The method of claim 3, further comprising the step of (g) releasing, for future inclusion in the allocated first logical buffer that corresponds to the first communications protocol, a portion of the allocated last logical buffer of the common physical buffer that stores data that the last communications protocol has already passed to the second device.

7. The method of claim 6 wherein the step of releasing the portion of the allocated last logical buffer of the common physical buffer comprises assigning an end pointer pointing to an end of the allocated last logical buffer to point to a preceding memory location in the common physical buffer.

8. The method of claim 3 wherein the first device is a computer and the second device is a modem.

9. The method of claim 3 wherein the first device is a modem and the second device is a computer.

10. The method of claim 1 wherein the first device is a computer and the second device is a modem.

11. The method of claim 1 wherein the first device is a modem and the second device is a computer.

12. A method of buffering transient data, the transient data being passed among multiple communications protocols while being transferred from a first device to a second device under the control of multiple subprograms, the method performed by a computer and comprising the steps of:

(a) for each of the multiple subprograms, allocating a corresponding logical buffer comprising a region in a physical buffer stored by the computer, the physical buffer storing data including the transient data contiguously in an order in which the data is transferred;

(b) when a first subprogram requests the data, passing the transient data from a first device to the first subprogram by shifting a first logical buffer in the physical buffer, the first logical buffer corresponding to the first subprogram, to include a new portion of the physical buffer and by storing the transient data in the new portion in the physical buffer;

(c) when a last subprogram requests the transient data, passing the transient data from the first subprogram to the last subprogram by shifting a last logical buffer in the physical buffer, the last logical buffer corresponding to the last subprogram, to include the portion of the physical buffer storing the transient data and by shifting the first logical buffer to exclude the portion storing the transient data; and (d) when the second device requests the transient data, passing the data from the second subprogram to the second device by transferring the data to the second device and shifting the last logical buffer to exclude a portion that stores the transient data after the transient data has already been transferred to the second device.

13. The method of claim 12 wherein the step of (c) passing the transient data from the first subprogram to the last subprogram comprises passing the transient data from the first subprogram to any number of intermediate subprograms, each corresponding to an allocated intermediate logical buffer in the physical buffer, the first, intermediate and last logical buffers being allocated contiguously within the physical buffer in an order corresponding to an order in which the transient data is passed among the first, intermediate and last subprograms, by performing the steps of:

(i) shifting each intermediate logical buffer corresponding to each intermediate subprogram to include a portion of a preceding logical buffer storing the transient data; and (ii) shifting the preceding logical buffer to exclude the portion storing the transient data.

14. The method of claim 13 wherein step (b) is repeated as often as the first subprogram requests the transient data, and step (c) is repeated as often as an intermediate subprogram requests the transient data.

15. The method of claim 13 wherein the step of (ci) shifting each intermediate logical buffer comprises assigning a beginning pointer pointing to a beginning of each intermediate logical buffer to point to a preceding memory location in the physical buffer, and the step of (cii) shifting the preceding logical buffer comprises assigning an end pointer pointing to an end of each intermediate logical buffer to point to a preceding memory location in the physical buffer.

16. The method of claim 13, further comprising the step of (d) releasing, for future inclusion in the first logical buffer corresponding to the first subprogram, a portion of the last logical buffer of the physical buffer that stores data that the last subprogram has already passed to the second device.

17. The method of claim 16 wherein the step of releasing the portion of the last logical buffer of the physical buffer comprises assigning an end pointer pointing to an end of the last logical buffer to point to a preceding memory location in the physical buffer.

18. A computer system for buffering transient data passed between the computer system and a remote device under the control of multiple communications protocols comprising:

a memory storing a common physical buffer which stores data including the transient data contiguously in an order in which the transient data is transferred;

a communications manager for managing passing of the transient data;

means for allocating for each of the multiple communications protocols a corresponding logical buffer in the common physical buffer;

means for passing the transient data from the computer system to a first communications protocol using the communications manager, when the first communications protocol requests the transient data, by shifting, in the common physical buffer, an allocated first logical buffer that corresponds to the first communications protocol to include a new portion of the common physical buffer and by storing the transient data in the new portion;

means for passing the transient data from the first protocol to a last communications protocol using the communications manager, when the last communications protocol requests the transient data, by shifting, in the common physical buffer, an allocated last logical buffer that corresponds to the last communications protocol to include the portion of the allocated first logical buffer storing the transient data and by shifting the allocated first logical buffer to exclude the portion storing the transient data; and means for transferring the transient data from the last communications protocol to the remote device when the remote device requests the data.

19. The computer system of claim 18 wherein the means for passing the transient data from the first communications protocol to the last communications protocol passes the transient data from the first communications protocol to any number of intermediate communications protocols, each corresponding to an allocated intermediate logical buffer allocated in the common physical buffer, the allocated first, intermediate and last logical buffers being allocated contiguously within the common physical buffer in an order corresponding to an order in which the transient data is passed among the first, intermediate and last communications protocols, and comprises:

means for shifting each allocated intermediate logical buffer corresponding to each intermediate communications protocol to include a portion of the preceding allocated logical buffer; and means for shifting each preceding allocated logical buffer to exclude the portion storing the transient data.

20. The computer system of claim 19 wherein the means for shifting each allocated intermediate logical buffer to include the portion comprises assigning a beginning pointer to a beginning of each allocated intermediate logical buffer to point to a preceding memory location in the common physical buffer, and the means for shifting each preceding allocated logical buffer to exclude the portion comprises assigning an end pointer pointing to an end of each allocated intermediate logical buffer to point to a preceding memory location in the common physical buffer.

21. A method of buffering transient data, the transient data being passed among multiple communications protocols while being transferred from a first device to a second device, the method performed by a computer and comprising the steps of:

(a) providing communications management code for managing passing of the transient data;

(b) allocating to each of the multiple communications protocols a corresponding logical buffer comprising a region in a common physical buffer, the common physical buffer storing data contiguously in an order in which the data is transferred;

(c) receiving from a first communications protocol a request for the transient data;

(d) in response to the received request from the first communications protocol, with the communications management code, passing the transient data from the first device to the first communications protocol by shifting, in the common physical buffer, an allocated first logical buffer that corresponds to the first communications protocol to include a new portion of the common physical buffer and by storing the transient data in the new portion;

(e) receiving from a last communications protocol a request for the transient data; and (f) in response to the received request from the last communications protocol, with the communications management code, passing the transient data from the first communications protocol to the last communications protocol by shifting, in the common physical buffer, an allocated last logical buffer to include the portion of the common physical buffer storing the transient data and by shifting, in the common physical buffer, the allocated first logical buffer to exclude the portion of the common physical buffer storing the transient data.

* * * * *